(12) United States Patent
Frechen et al.

(10) Patent No.: US 10,999,224 B1
(45) Date of Patent: May 4, 2021

(54) METHOD AND APPARATUS FOR PARSING AN ELECTRONIC MESSAGE AND CONSTRUCTING MULTIPLE DIFFERENTLY PRIORITIZED MESSAGES THEREFROM

(71) Applicant: McKesson Corporation, Irving, TX (US)

(72) Inventors: Melissa Frechen, Atlanta, GA (US); Patrick Harris, Brookhaven, GA (US)

(73) Assignee: MCKESSON CORPORATION, Irving, TX (US)

( * ) Notice: Subject to any disclaimer, the term of this patent is extended or adjusted under 35 U.S.C. 154(b) by 0 days.

(21) Appl. No.: 15/925,011

(22) Filed: Mar. 19, 2018

Related U.S. Application Data

(63) Continuation-in-part of application No. 15/422,184, filed on Feb. 1, 2017.

(51) Int. Cl.
*H04L 12/58* (2006.01)
(52) U.S. Cl.
CPC .............. *H04L 51/04* (2013.01); *H04L 51/26* (2013.01)
(58) Field of Classification Search
CPC ...................................................... H04L 51/04
See application file for complete search history.

(56) References Cited

U.S. PATENT DOCUMENTS

2001/0039589 A1* 11/2001 Aho ...................... H04L 69/329
709/230
2006/0085385 A1* 4/2006 Foster ................. G06F 16/1834

2007/0202886 A1* 8/2007 Dhebri .................. H04W 4/021
455/456.1
(Continued)

FOREIGN PATENT DOCUMENTS

| CN | 102362778 | 2/2012 |
| KR | 100755440 | 9/2007 |
| KR | 100793852 | 1/2008 |
| KR | 101038074 | 6/2011 |
| KR | 101101692 | 12/2011 |

(Continued)

OTHER PUBLICATIONS

Extended European Search Report for European Application No. 13809457.8 dated Apr. 15, 2016.
(Continued)

*Primary Examiner* — Nicholas P Celani
(74) *Attorney, Agent, or Firm* — Alston & Bird LLP

(57) ABSTRACT

A method, computing device and computer program product parse an electronic message and construct multiple differently prioritized messages therefrom. For a method, an electronic message is parsed to separately identify the first and second differently formatted portions and the electronic message is analyzed to identify an action to be taken based thereupon. If a first action is to be taken, a first message is constructed based upon the first portion formatted in accordance with the first predefined format to be transmitted to a first request processor and a first response is then received therefrom. A second message is constructed based upon the second portion formatted in accordance with the second predefined format. The first response is analyzed and, if the first response is of a first type, the second message is transmitted to a second request processor and a second response is then received from the second request processor.

19 Claims, 5 Drawing Sheets

(56) References Cited

U.S. PATENT DOCUMENTS

| | | | | |
|---|---|---|---|---|
| 2007/0260750 A1* | 11/2007 | Feied | ............... | H04L 67/06 |
| | | | | 709/246 |
| 2013/0041968 A1* | 2/2013 | Cohen | ............... | H04L 51/24 |
| | | | | 709/206 |
| 2015/0088557 A1* | 3/2015 | Huynh | ............... | G06Q 40/08 |
| | | | | 705/4 |
| 2015/0149197 A1* | 5/2015 | Guinan | ............... | G16H 40/20 |
| | | | | 705/2 |
| 2015/0154565 A1 | 6/2015 | Kaehler et al. | | |
| 2015/0213195 A1 | 7/2015 | Blechman | | |
| 2016/0307195 A1* | 10/2016 | Cantwell | ............... | G06Q 20/401 |

FOREIGN PATENT DOCUMENTS

| | | |
|---|---|---|
| KR | 20110138108 | 12/2011 |
| KR | 20110138572 | 12/2011 |
| KR | 101154858 | 6/2012 |

OTHER PUBLICATIONS

Office Action for U.S. Appl. No. 15/422,184 dated Sep. 10, 2018.
Decision to Grant European Patent Application No. 13809457.8 dated May 18, 2017.
Office Action for U.S. Appl. No. 15/422,184 dated Feb. 15, 2019.
Office Action for U.S. Appl. No. 15/925,948 dated Jun. 25, 2019.
Office Action for U.S. Appl. No. 15/422,184 dated Aug. 27, 2019.
Office Action for U.S. Appl. No. 15/422,184 dated Jan. 14, 2020.
Office Action for U.S. Appl. No. 15/925,948 dated Oct. 23, 2019.
United States Patent and Trademark Office, Advisory Action for U.S. Appl. No. 15/422,184, dated Mar. 26, 2020, 29 pages, U.S.A.
United States Patent and Trademark Office, Office Action for U.S. Appl. No. 15/925,948, dated Mar. 23, 2020, 29 pages, U.S.A.
United States Patent and Trademark Office, Advisory Action for U.S. Appl. No. 15/925,948, dated Jan. 31, 2020, 4 pages, U.S.A.
United States Patent and Trademark Office, Advisory Action for U.S. Appl. No. 15/422,184, dated Jun. 25, 2019, 4 pages, U.S.A.
United States Patent and Trademark Office, Office Action received for U.S. Appl. No. 15/422,184, dated May 18, 2020, 31 pages, U.S.A.
United States Patent and Trademark Office, Notice of Allowance received for U.S. Appl. No. 15/422,184, dated Oct. 13, 2020, 12 pages, U.S.A.
United States Patent and Trademark Office, Notice of Allowance received for U.S. Appl. No. 15/925,948, dated Nov. 5, 2020, 22 pages, U.S.A.

* cited by examiner

METHOD AND APPARATUS FOR PARSING AN ELECTRONIC MESSAGE AND CONSTRUCTING MULTIPLE DIFFERENTLY PRIORITIZED MESSAGES THEREFROM

CROSS-REFERENCE TO RELATED APPLICATIONS

This application is a continuation-in-part of U.S. application Ser. No. 15/422,184, filed Feb. 1, 2017, the entire contents of which are incorporated herein by reference.

TECHNOLOGICAL FIELD

An example embodiment of the present invention relates to parsing an electronic message and to constructing multiple differently prioritized messages therefrom.

BACKGROUND

Messages are frequently transmitted in accordance with a predefined structure. The predefined structure generally defines the fields of information included within the message and the format in which the information is presented within each of the fields. While structured messages of this type are useful in terms of insuring that at least certain types of information are included within the message and that those certain types of information are transmitted in a manner that may be readily and consistently interpreted by the recipient, structured messages may limit the types of information that are conveyed and correspondingly limit the functionality that can be supported by messages having the predefined structure.

By way of example, the limitations upon the information that may be conveyed via a structured message and the format in which the information must be conveyed may prevent that message from supporting additional functionality needed by the sender or recipient, or require supplemental messages to be transmitted in order to provide additional information to the same recipient, particularly in instances in which the additional information is required in order for the recipient to perform additional functionality or services. This increase in the number of messages so as to provide additional information beyond that supported by structured messages not only increases the complexity and processing demands upon the source and recipient of the messages in order for the source to construct such supplemental messages, and for the recipient to link and interpret the additional messages, but also increases the load upon the network that must transmit the additional messages, as well as the risk of loss of such additional information in the event of errors when attempting to link or associate the supplemental messages.

By preventing a message from supporting additional functionality needed by the sender or recipient, the limitations upon the information that may be conveyed via a structured message may in some instances require the sender and recipient to develop a different work flow in order to support the additional functionality. For example, the sender and recipient may define a batch process for conveying the information that is not supported by the structured messages. As such, a time delay is created between the time at which the messages could otherwise have been transmitted in real time or near real time and the time at which the messages are submitted in batch format. As a result, the responses to the messages submitted in batch format are necessarily delayed and are not provided in real time or near real time, thereby limiting or even eliminating the usefulness of the responses for some applications that are dependent upon more timely feedback. Moreover, the development and support of alternative work flows for functionality that is not supported by the structured messages complicates the interaction between the parties by imposing additional and different work flows that must be followed in certain situations.

BRIEF SUMMARY

A method, computing device and computer program product are provided in accordance with an example embodiment in order to facilitate the inclusion of additional information in a single message beyond that for which the original message structure is predefined. As a result, the functionality or services performed by or for the source or recipient of the message may be enhanced by reliance upon the additional information that may be included in the message. By including additional information in the message in a manner that is able to be interpreted by the source or recipient, the method, computing device and computer program product of an example embodiment reduces or at least limits any increase in the number of messages transmitted between a source and the recipient in order to convey the additional information so as to enable the provision of the additional functionality or services, thereby reducing or limiting any increase in the load otherwise imposed upon the network that supports the delivery of the messages. Similarly, the method, computing device and computer program product of an example embodiment increase the efficiency with which the source and recipient communicate by reducing the number of messages that must be constructed by the source and linked and interpreted by the recipient in order to convey the additional information, as well as reducing or eliminating the risk of loss of such additional information in the event of errors when attempting to link or associate the supplemental messages. Further, the method, computing device and computer program product of an example embodiment permit sufficient information to be included within the message such that some messages that otherwise must be submitted in accordance with a different work flow, such as in a batch format so as to generate a delayed response, may now be submitted and processed in a single message, thereby avoiding the delays and additional storage and processing requirements necessitated by batch processing and facilitating an enhanced user experience as a result of the timely responses for each of the different types of messages.

In one embodiment, a computing device is provided to parse an electronic message and to construct multiple differently prioritized messages therefrom. The computing device includes a communication interface configured to receive the electronic message that includes a first portion formatted in accordance with a first predefined format and a second portion formatted differently than the first predefined portion. The computing device also includes processing circuitry configured to parse the electronic message to separately identify the first and second portions and to analyze the electronic message to identify an action to be taken based thereupon. In response to identification of a first action to be taken, the processing circuitry is configured to construct a first message based at least in part upon the first portion formatted in accordance with the first predefined format to be transmitted to a first request processor. Based upon the first message including the first portion formatted in accordance with the first predefined format, the processing circuitry is configured to receive a first response from the first request processor. The processing circuitry is also configured to construct a second message based at least in part upon the second portion formatted in accordance with the second predefined format. The processing circuitry is further configured to analyze the first response and, in an instance in which the first response is of a first type, cause the second message that is constructed based at least in part upon the second portion formatted in accordance with the second predefined format to be transmitted to a second request processor, different than the first request processor, and based upon the second message, receive a second response from the second request processor. Based upon at least one of the first response from the first request processor or the second response from the second request processor, the processing circuitry is configured to construct a response to the electronic message that is to be transmitted. The computing device also includes a database in communication with the processing circuitry and configured to store one or more of the electronic message, the first message, the first response, the second message, the second response or the response to the electronic message.

The processing circuitry of an example embodiment is configured to analyze the electronic message by identifying a qualifier field indicative of the action to be taken. In response to identification of a second action, different than the first action, to be taken, the processing circuitry of an example embodiment is configured to construct the second message, to cause the second message to be transmitted to the second request processor and to receive the second response, without first constructing the first message. The processing circuitry of an example embodiment is configured to construct the second message only after analysis of the first response indicates that the first response is of a first type. The processing circuitry of an example embodiment is configured to construct the second message based upon parts of both the first and second portions of the electronic message. The processing circuitry of an example embodiment is configured to construct the first message based upon the first portion of the electronic message without reference to the second portion of the electronic message. In an example embodiment, the first action includes an adjudication request for a pharmacy claim, wherein the first type of the first response includes a denial of the pharmacy claim and wherein the second action includes an adjudication request for a medical claim.

In another example embodiment, a method is provided for parsing an electronic message and constructing multiple differently prioritized messages therefrom. The method includes receiving an electronic message including a first portion formatted in accordance with a first predefined format and a second portion formatted differently than the first predefined portion. The method parses the electronic message to separately identify the first and second portions and analyzes the electronic message to identify an action to be taken based thereupon. In response to identification of a first action to be taken, the method constructs a first message based at least in part upon the first portion formatted in accordance with the first predefined format to be transmitted to a first request processor. Based upon the first message including the first portion formatted in accordance with the first predefined format, the method receives a first response from the first request processor. The method also constructs a second message based at least in part upon the second portion formatted in accordance with the second predefined format. The method additionally analyzes the first response and, in an instance in which the first response is of a first type, causes the second message that is constructed at least in part upon the second portion formatted in accordance with the second predefined format to be transmitted to a second request processor, different than the first request processor, and, based upon the second message, receives a second response from the second request processor. Based upon at least one of the first response from the first request processor or the second response from the second request processor, the method constructs a response to the electronic message that is to be transmitted. The method also stores, in a database, one or more of the electronic message, the first message, the first response, the second message, the second response or the response to the electronic message.

The method of an example embodiment analyzes the electronic message by identifying a qualifier field indicative of the action to be taken. In response to identification of a second action, different than the first action, to be taken, the method of an example embodiment also constructs the second message, causes the second message to be transmitted to the second request processor and receives the second response, without first constructing the first message. In an example embodiment, the second message is constructed only after analysis of the first response indicates that the first response is of a first type. The method of an example embodiment constructs the second message by constructing the second message based upon parts of both the first and second portions of the electronic message. The method of an example embodiment constructs the first message by constructing the first message based upon the first portion of the electronic message without reference to the second portion of the electronic message. In an example embodiment, the first action includes an adjudication request for a pharmacy claim, the first type of the first response includes a denial of the pharmacy claim and the second action includes an adjudication request for a medical claim.

In a further example embodiment, a computer program product is provided that is configured to parse an electronic message and construct multiple differently prioritized messages therefrom. The computer program product includes a non-transitory computer readable medium having program code stored thereon with the program code including program code instructions configured, upon execution, to receive an electronic message comprising a first portion formatted in accordance with a first predefined format and a second portion formatted differently than the first predefined portion, to parse the electronic message to separately identify the first and second portions and to analyze the electronic message to identify an action to be taken based thereupon. The program code also includes program code instructions configured to construct, in response to identification of a first action to be taken, a first message based at least in part upon the first portion formatted in accordance with the first predefined format to be transmitted to a first request processor. The program code also includes program code instructions configured to receive a first response from the first request processor based upon the first message including the first portion formatted in accordance with the first predefined format. The program code also includes program code instructions configured to construct a second message based at least in part upon the second portion formatted in accordance with the second predefined format. The program code further includes program code instructions configured to analyze the first response and, in an instance in which the first response is of a first type, cause the second message that is constructed based at least in part upon the second portion formatted in accordance with the second predefined format to be transmitted to a second request processor, different than the first request processor, and based upon the second message, receive a second response from the second request processor. The program code further includes program code instructions configured to construct, based upon at least one of the first response from the first request processor or the second response from the second request processor, a response to the electronic message that is to be transmitted. Further, the program code includes program code instructions configured to store, in a database, one or more of the electronic message, the first message, the first response, the second message, the second response or the response to the electronic message.

In an example embodiment, the program code instructions configured to analyze the electronic message include program code instructions configured to identify a qualifier field indicative of the action to be taken. The program code of an example embodiment further include program code instructions configured, in response to identification of a second action, different than the first action, to be taken, to construct the second message, to cause the second message to be transmitted to the second request processor and to receive the second response, without first constructing the first message. In an example embodiment, the program code instructions configured to construct the second message include program code instructions configured to construct the second message only after analysis of the first response indicates that the first response is of a first type. The program code instructions configured to construct the second message in accordance with an example embodiment include program code instructions configured to construct the second message based upon parts of both the first and second portions of the electronic message. In an example embodiment, the program code instructions configured to construct the first message include program code instructions configured to construct the first message based upon the first portion of the electronic message without reference to the second portion of the electronic message.

BRIEF DESCRIPTION OF THE DRAWINGS

Figure 1:
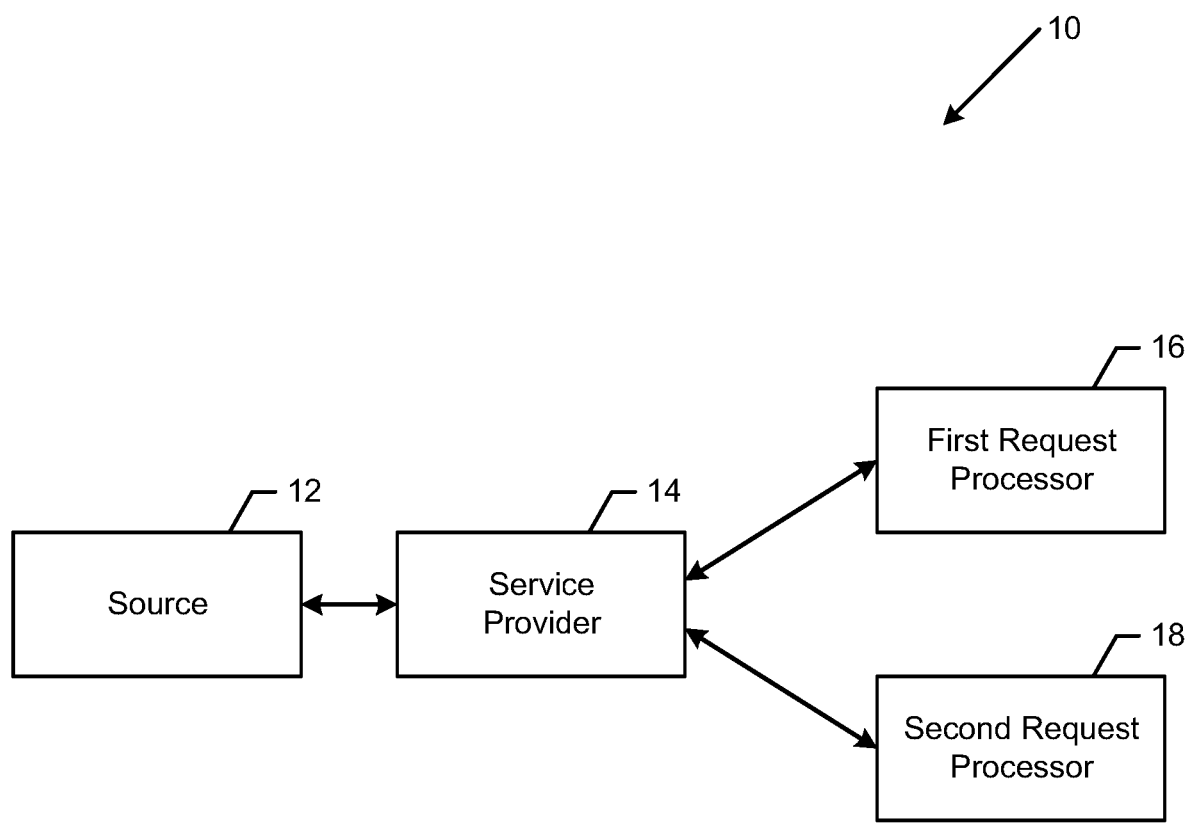
Figure 2:
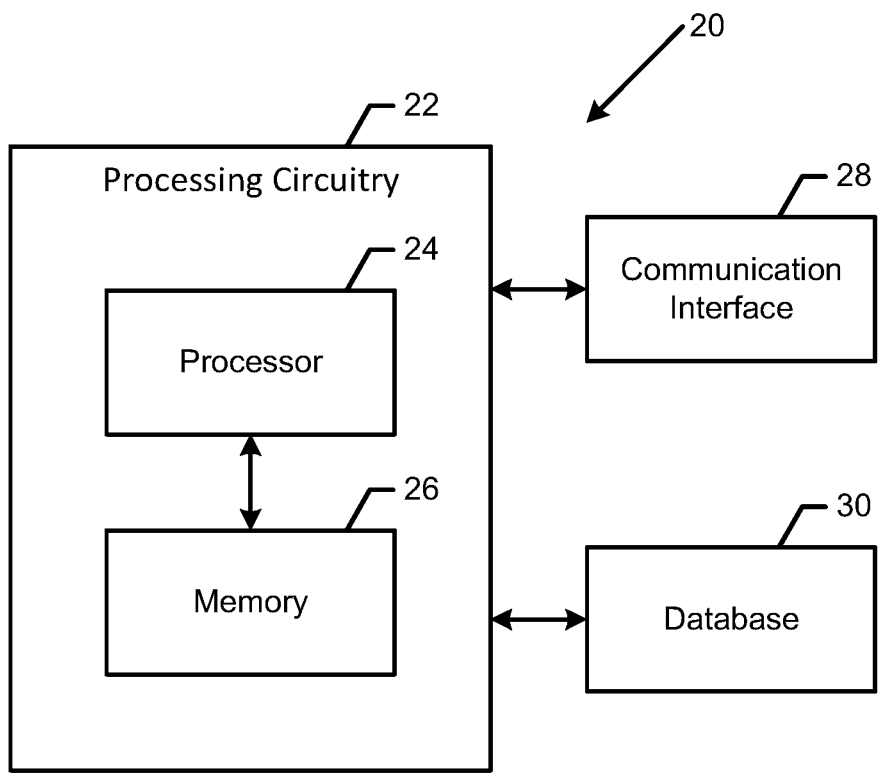
Figure 3:
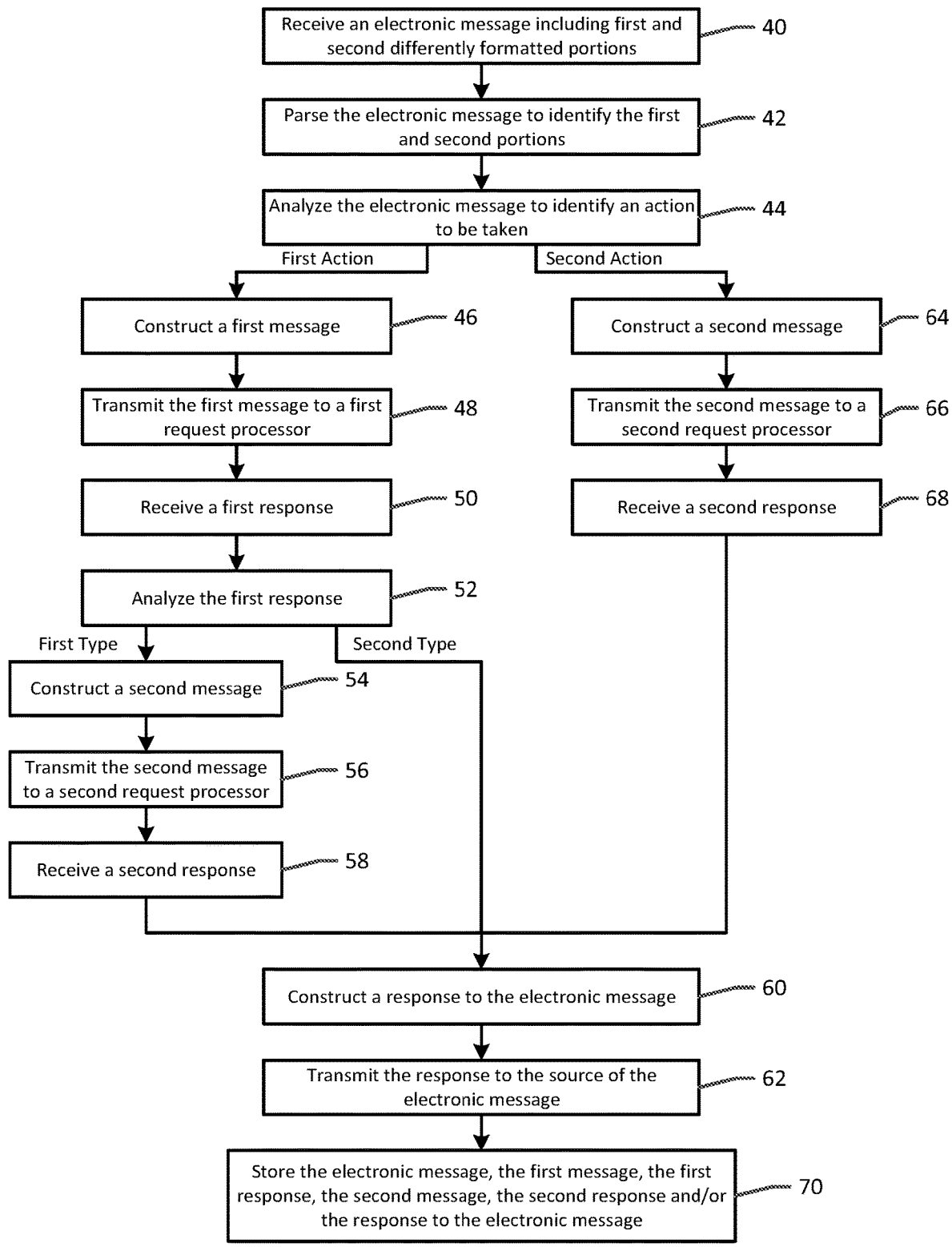
Figure 4:
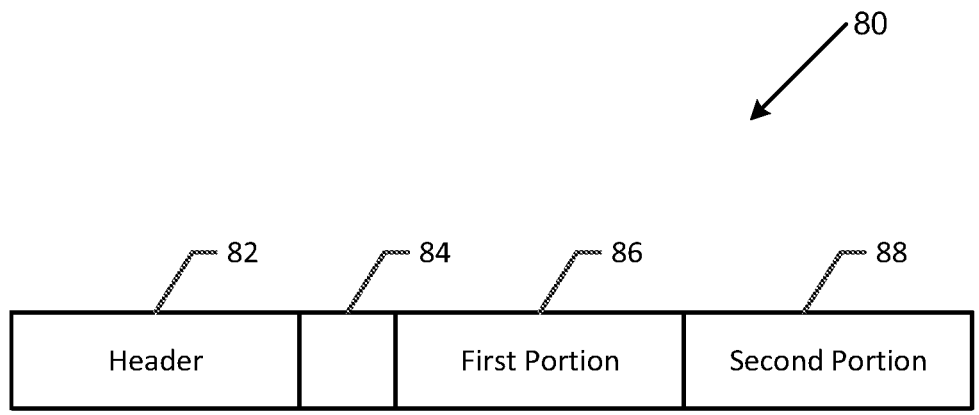
Figure 5:
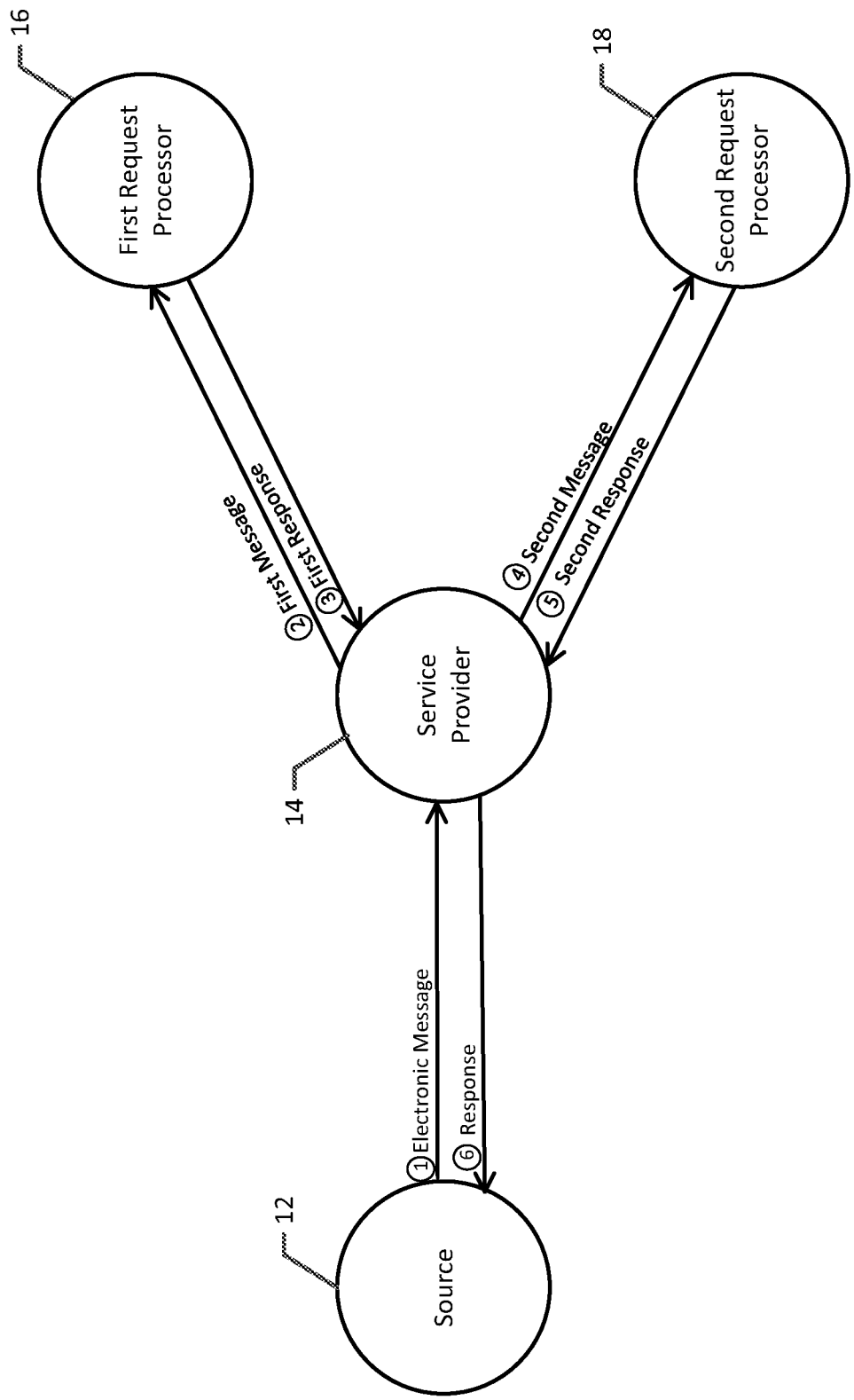

Having thus described certain embodiments of the invention in general terms, reference will now be made to the accompanying drawings, which are not necessarily drawn to scale, and wherein:

FIG. 1 is a diagram of a system configured to parse an electronic messages and to construct multiple differently prioritized messages therefrom in accordance with an example embodiment of the present invention;

FIG. 2 is a block diagram of a computing device that may be specifically configured in accordance with an example embodiment of the present invention;

FIG. 3 is a flow chart illustrating the operations performed, such as by the switch of FIG. 1 embodied by the computing device of FIG. 2, in accordance with an example embodiment of the present invention;

FIG. 4 is an example of an electronic message that is processed in accordance with an example embodiment of the present invention; and FIG. 5 is a signal flow diagram illustrating the messages exchanged in conjunction with the processing of either a pharmacy claim or a medical claim in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, computing device, and computer program product are provided in accordance with an example embodiment in order to process electronic messages having a first portion with a predefined format and a second, differently formatted second portion that includes additional information by analyzing an electronic message, constructing other differently prioritized messages based thereupon and updating a database including one or more of the messages. The first portion of the electronic message may provide the information typically provided by a structured message. By providing for the inclusion of the additional information along with the first portion in the same electronic message, however, the electronic message may efficiently convey other types of information from a source to a recipient, thereby reducing or at least limiting any increase in the number of messages transmitted between the source and the recipient in order to convey the additional information which, in turn, reduces or limits any increase in the load otherwise imposed upon the network that supports the delivery of the electronic messages. Moreover, the additional information included in the electronic message may facilitate the provision of additional functionality and services by the recipient or others in response to the electronic message that was not previously available. For example, the method, computing device and computer program product of an example embodiment permit sufficient information to be included within the message such that some messages that otherwise must be submitted in batch format so as to generate a delayed response may now be submitted and processed and, as a result, generate a response in real time or near real time, thereby avoiding the delays and additional storage and processing requirements necessitated by batch processing and facilitating an enhanced user experience as a result of the timely responses for each of the different types of messages.

By way of example, a system 10 that is configured to communicate and process electronic messages having a first portion with a predefined format and a second, differently formatted second portion that includes additional information is depicted in FIG. 1. As shown, the electronic message may be provided by a source 12 and received by a service provider 14, such as a switch. After parsing the different portions of the electronic message provided by the source and constructing one or more differently prioritized messages based thereupon, the service provider is configured to communicate with a first request processor 16 and, in some embodiments, with a second request processor 18. In some embodiments, the second request processor is different than the first request processor. Although the method, computing device and computer program product may be employed in various applications, the method, computing device and computer program product of example embodiments are employed in conjunction with electronic messages conveying additional information that is communicated and processed in conjunction with telecommunication applications, content delivery and provisioning and healthcare applications, such as in conjunction with the submission and evaluation of prescription and/or medical claims, such as a prescription claim and/or a medical claim submitted by a pharmacy management system, and the provision of feedback regarding reimbursement of the pharmacy by a claims payor, e.g., an insurance company or the like, to name but a few. In an application involving the submission and evaluation of prescription and/or medical claims, the first and second request processors may both be claims processors configured to adjudicate claims and to provide the service provider with the results of the adjudication. In this regard, the first request processor may be a prescription claims processor for adjudicating prescription claims and the second request processor may be a medical claims processor for adjudicating medical claims.

The service provider 14 may be configured in various manners, but, in embodiment, the service provider includes a computing device 20 configured to parse and differently process different portions of an electronic message and may be embodied as shown in FIG. 2. In this regard, the computing device that embodies the service provider may include or otherwise be in communication with a processing system including, for example, processing circuitry 22 that is configurable to perform actions in accordance with example embodiments described herein. The processing circuitry may be configured to perform data processing, application execution and/or other processing and management services. The processing circuitry may include a processor 24 and memory 26 that may be in communication with or otherwise control a communication interface 28 and a database 30. The computing device may also include the communication interface and the database as shown in FIG. 2, or the communication interface and/or the database may be separate from, but in communication with, the computing device.

In an example embodiment, the memory 26 may include one or more non-transitory memory devices such as, for example, volatile and/or non-volatile memory that may be either fixed or removable. The memory may be configured to store information, data, applications, instructions or the like for enabling the computing device 20 to carry out various functions in accordance with example embodiments of the present invention. For example, the memory could be configured to buffer input data for processing by the processor 24. Additionally or alternatively, the memory could be configured to store instructions for execution by the processor.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry) specifically configured to perform operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

The communication interface 28 may include one or more interface mechanisms for enabling communication with the request processor 16 and other entities 18. In this regard, the communication interface may include, for example, an antenna (or multiple antennas) and supporting hardware and/or software for enabling the communications therewith.

The database 30 may be embodied by any of a variety of data storage devices such as a Network Attached Storage (NAS) device or devices, or as a separate database server or servers. The database 30 includes information accessed and stored by the processing circuitry 22 to facilitate the operations of the service provider 14. For example, the database 30 may comprise a series of tables configured to store data received from one or more other entities and/or information regarding different types of messages and/or portions of different types of messages as described below.

The operations performed by the computing device 20 embodied by the service provider 14 are depicted in an example embodiment in FIG. 3. As shown in block 40 of FIG. 3, the computing device of an example embodiment, such as the processing circuitry 22, the processor 24, the communication interface 28 or the like, is configured to receive an electronic message from a source 12. Although different types of electronic messages may be received depending upon the application, the electronic message may be an electronic healthcare message, such as a prescription claim, e.g., a prescription reimbursement request, a prescription reversal request, a predetermination of prescription benefits request or the like, or a medical claim, e.g., a medical reimbursement request, a medical reversal request, a predetermination of medical benefits request or the like, generated by the source, such as a pharmacy management system, and directed to the service provider, e.g., a switch, for processing and adjudication. In this embodiment, the electronic healthcare message typically includes information that identifies the patient, the medication, product, or service being requested, the healthcare provider (either the prescriber, pharmacy or both), and the benefit plan, insurer, or government-funded payor for the patient.

A pharmacy management system may be operated by a pharmacy in order to track the fulfillment of the various prescriptions and to submit prescription claims for reimbursement, requests for the predetermination of prescription benefits or the like via the service provider 14 to various claim processors in order to obtain an analysis of the prescription claim or other request submitted by the pharmacy management system and to identify, for example, the patient's out of pocket costs, typically in real time or near real time. In the context of a predetermination of prescription benefits request, the claims processor responds with an indication as to whether or not the prescription claim will be reimbursed and, if so, to what extent and the service provider, in turn, provides this information to the pharmacy management system.

In some situations, a pharmacy may be unaware as to whether a prescription or service is to be paid, in whole or in part, by a prescription benefits plan or other prescription insurance plan of the patient or by a medical insurance plan of the patient or whether the patient has no insurance coverage for the prescription or service. By way of example, certain medications, such as specialty medications that are quite expensive, be they for immunizations or other purposes, may not always be covered via the prescription benefits plan and may, instead, be covered, in some instances, by the medical insurance plan of the patient. However, the pharmacy may be unaware as to the particular insurance plan or benefits coverage under which the medication or service is to be covered. While a pharmacy management system may receive a relatively quick response from a prescription claims processor as to whether a pharmacy claim, such as a prescription reimbursement request or a predetermination of prescription benefits request, the pharmacy management system does not generally receive a similarly quick response with respect to medical claims, such as medical reimbursement requests or a predetermination of medical benefits request. Instead, a pharmacy management system generally submits medical claims in a batch process for subsequent claims processing and may not receive a response following the adjudication of the medical claims for some period of time, such as days or weeks. As such, in an instance in which a medication or other service is not covered by the prescription benefits plan or other prescription insurance plan of a patient, the pharmacy will not generally learn in real time or near real time, such as while the patient is at the pharmacy, as to whether the medication or other service will be covered by the medical insurance plan of the patient and, if so, to what extent the cost of the medication or service is to be covered. Moreover, in an instance in which a medication or other service is not covered by the prescription benefits plan or other prescription insurance plan of the patient, the message returned from the prescription claims processor denying coverage and the subsequent efforts to include a medical claim for the medication or service in a subsequent batch of medical claims may undesirably increase the demand on processing and memory resources of the pharmacy management system due to, for example, the receipt of the message denying coverage and the construction and subsequent tracking of the batch of medical claims. In accordance with an example embodiment, however, the electronic message provided by the source 12 and received by the computing device 20 of the service provider 14 permits a claim to be adjudicated first as a prescription claim and then, in some circumstances, as a medical claim. Thus, a claim may be fully adjudicated without undesirably increasing the load upon the network by limiting or avoiding additional message traffic with the source, even in an instance in which the source is unaware of whether the claims should be adjudicated as a prescription claim or a medical claim.

In one embodiment, the source 12, such as a pharmacy management system, may maintain a listing of medications for which coverage may be provided either by a patient's prescription benefits plan or prescription insurance plan or by a patient's medical insurance plan. In such an instance, the source may be unaware of the type of claim to be submitted for dispensation of a medication included in the listing and, as such, may submit an electronic message of the type described herein in an instance in which the medication is included in the listing. This listing of medications may be updated over the course of time.

Regardless of the type of electronic message, the electronic message includes a first portion formatted in accordance with a first predefined format and a second portion formatted differently than the first predefined portion. As shown in block 42, the computing device 20, such as the processing circuitry 22, the processor 24 or the like, is configured to parse the electronic message so as to separately identify the first and second portions. The content provided by the first and second portions and the particular formats of the first and second portions may vary depending upon the application and the corresponding type of the electronic message. In the context of an electronic healthcare message, however, one example of an electronic message is depicted in FIG. 4. The electronic healthcare message 80 of this example embodiment includes a wrapper as defined by the header field 82. The header provides various information with respect to the electronic healthcare message, such as by identifying the electronic healthcare message to be of the type that includes a first portion formatted in accordance with a first predefined format and a second portion formatted differently than the first predefined portion. The header may also serve to secure the electronic healthcare message such that a recipient can access the payload of the electronic healthcare message only after having satisfied the security requirements imposed by the header.

The electronic healthcare message 80 of this example embodiment includes a qualifier field 84, such as a flag. A qualifier field of an example embodiment has a plurality of different predefined values with each predefined value representative of a different type of electronic healthcare message. For example, the qualifier field may have a first value to identify the electronic healthcare message to be related to a prescription claim, such as a prescription reimbursement request, a predetermination of prescription benefits request, a prescription reversal request or the like. The qualifier field of this example embodiment may also have a second value to identify the electronic healthcare message to be related to a medical claim, such as a medical reimbursement request, a predetermination of medical benefits request, a medical reversal request or the like.

The electronic healthcare message of the example embodiment also includes a first portion 86 formatted in accordance with a first predefined format and a second portion 88 formatted differently than the first predefined format. Although the first predefined format may vary from one electronic healthcare message to another, the first portion of an electronic healthcare message of an example embodiment is formatted in accordance with the National Council for Prescription Drug Programs (NCPDP) telecommunications standard that is utilized in conjunction with the submission of prescription claims. In contrast, the second portion of the electronic healthcare message may have any of a variety of different formats with the format of the second portion being different that the first predefined format. The qualifier field 84 may include different values indicative of the presence or absence of the second portion, the presence or absence of the first portion as well as an indication as to whether or not the first portion is formatted in accordance with NCPDP.

Following parsing of the electronic message, the computing device 20 embodied by the service provider 14, such as the processing circuitry 22, the processor 24 or the like, is configured to analyze the electronic message to identify an action to be taken based thereupon. See block 44 of FIG. 3. With respect to an electronic healthcare message 80 of the type depicted in FIG. 4, for example, the computing device, such as the processing circuitry, the processor or the like, is configured to analyze the qualifier field 84 to determine the action to be taken. For example, the analysis of the qualifier field may determine whether the electronic healthcare message relates to a prescription claim or a medical claim. Based upon a determination as to whether the electronic healthcare message relates to a prescription claim or to a medical claim, the action to be taken in response to the electronic healthcare message, may be determined since different actions are taken in accordance with an example embodiment depending upon whether the electronic healthcare message relates to a prescription claim or to a medical claim.

After having parsed the electronic message and in an instance a determination is made that a first action is to be taken, such as a result of qualifier field 84 indicating that the electronic healthcare message relates to a prescription claim (as opposed to a medical claim), the computing device 20, such as the processing circuitry 22, the processor 24, the communication interface 28 or the like, is configured to construct a first message to be transmitted to the request processor 16. See block 46 of FIG. 3. The first message is based at least in part upon the first portion of the electronic message and, in some embodiments, includes the first portion from the electronic message received from the source. In the context of an electronic healthcare message, the first message that is constructed may be a prescription claim, such as a prescription reimbursement request or a predetermination of prescription benefits request. The computing device, such as the processing circuitry, the processor, the communication interface or the like, is therefore also configured to transmit the first message to the first claims processor 16, such as a prescription claims processor of a payor of prescription claims, e.g., an insurance company. See block 48 of FIG. 3. A prescription claims processor is configured to analyze the prescription claim based upon the insurance or other payor rules and to provide a response indicative of whether coverage is provided for the prescription claim that is the subject of the first message and, if so, the reimbursement amount that will be paid by the payor to the pharmacy upon dispensation of the medication that is the subject of the prescription. As noted above, the first message that is transmitted to the first claims processor in this example embodiment is based at least in part upon the first portion of the electronic healthcare message and, in some embodiments, includes the first portion of the electronic healthcare message since prescription claims processors may be configured to interpret and analyze a prescription claim submitted in accordance with the first predefined format, such as NCPDP, and do not correspondingly interpret and analyze prescription claims submitted in accordance with a different format.

Based upon the first message, the computing device 20, such as the processing circuitry 22, the processor 24, the communication interface 28 or the like, is configured to receive a first response from the first request processor 16. See block 50 of FIG. 3. The computing device, such as the processing circuitry, the processor or the like, is also configured to analyze the first response to determine the type of response, such as by determining whether the first response is of a first type or a second type. See block 52 of FIG. 3. In the context of an electronic healthcare message and, more particularly, a prescription claim, the first response may provide an indication as to the coverage, if any, provided by the claims payor for the medication that is the subject of the prescription claim. In one embodiment, the first response of the first type indicates that coverage is not provided by a prescription benefits plan or other prescription insurance plan of the patient. In this situation, the first response may provide an indication as to the reason for denial of the prescription claim. In this embodiment, the first response of the second type indicates that coverage is provided by a prescription benefits plan or other prescription insurance plan of the patient. In this situation, the first response may provide a reimbursement amount indicative of the monetary amount for which the pharmacy will be reimbursed by the claims payor in response to dispensation of the medication that is the subject of the prescription and, in some embodiments, an indication of the patient's out-of-pocket costs attributable to, for example, satisfaction of the patient's deductible, the patient's co-pay, etc. for the dispensation of the medication may also be provided.

Based upon the parsing of the electronic message and the analysis of the electronic message, such as the qualifier field 84, the service provider 14 is configured to provide additional functionality based upon the second portion of the electronic message. For example, in an instance in which the analysis of the first response determines that the first response is of the first type in which the prescription claim has been rejected, such as due to the medication that is the subject of the prescription claim not being covered by the prescription benefits plan, the prescription insurance plan or the like, the computing device 20 of an example embodiment is configured to subsequently evaluate the electronic message to determine if the electronic message, in fact, intends for a different action, that is, different than the first action, to be taken notwithstanding the qualifier field having provided an indication that the first action was to be taken. In regards to an electronic healthcare message that the qualifier field indicated to be related to a prescription claim (that has now been denied by a prescription claims processor), the computing device of this example embodiment is configured to respond to the rejection of the prescription claim with the construction and submission for adjudication of a medical claim for the same medication or service that was the subject of the prescription claim that has now been rejected. This construction and adjudication of a medical claim for the same medication or service that was the subject of the prescription claim that has now been rejected may be performed by the computing device of an example embodiment without the exchange of messages with the source 12 of the electronic message, such as a pharmacy management system, thereby reducing the number of messages via the network and processed by the service provider 14 and the source so as to avoid further loading of the network and to conserve processing resources of the service provider and the source.

In this example embodiment in which the first response is determined to be of the first type, the computing device 20, such as the processing circuitry 22, the processor 24 or the like, is configured to construct a second message. See block 54 of FIG. 3. In this scenario in which the analysis of the electronic message determines that a first action is to be taken, the construction and adjudication of the first message is prioritized relative to, that is, has a greater priority than, the construction and adjudication of the second message. In this regard, the first message is constructed and transmitted and the first response generated based upon the adjudication of the first message is completed prior to acting upon the second message.

In the context of an electronic healthcare message and in which the first type of the first response is a rejection of the prescription claim, the computing device 20 is configured to construct a second message in the form of a medical claim, such as a medical reimbursement request, the predetermination of medical benefits request or the like. The medical claim may be constructed from information included within the second portion 88 of the electronic healthcare message and, in some embodiments, in combination with some of the information from the first portion 86 of the electronic healthcare message. In this regard, the computing device, such as a processing circuitry 22, the processor 24 or the like, is configured to obtain data values from a plurality of predefined fields in the second portion of the electronic healthcare message and, in some embodiments, to combine the data values drawn from predefined fields of the second portion with data values from one or more fields of the first portion of electronic healthcare message to construct the medical claim and/or with one or more predefined values stored or accessible by the computing device. The second message may be constructed to have a different format than the first message since the first and second messages are transmitted to different request processors. In this regard, the second message that includes a medical claim may be constructed to have an X12 format, while the first message that includes a prescription claim may be constructed to have an NCPDP format.

The computing device 20, such as the processing circuitry 22, the processor 24, the communication interface 28 or the like, is also configured to transmit the second message to the second claims processor 18, such as a medical claims processor of a payor of medical claims, e.g., an insurance company. See block 56 of FIG. 3. While the embodiment of FIG. 3 depicts the second message to be constructed after the adjudication of the first message and after the analysis of the first response indicates that the first response is of the first type, the second message may be constructed at an earlier stage, such as concurrent with the construction of the first message or during adjudication of the first message, in other embodiments. Regardless of when the second message is constructed, the second message is not transmitted in this scenario (in an instance in which the initial analysis of the electronic message indicates that a first action is to be taken) until after the first message has been adjudicated and the first response is determined to be of the first type. As a result of the subsequent transmission and adjudication of the second message, the second message is of a lower priority than the first message regardless of when the second message is constructed. A medical claims processor is configured to analyze the medical claim based upon the insurance or other payor rules and to provide a response indicative of whether coverage is provided for the medical claim that is the subject of the second message and, if so, the reimbursement amount that will be paid by the payor to the pharmacy upon dispensation of the medication that is the subject of the prescription.

Based upon the second message, the computing device 20, such as the processing circuitry 22, the processor 24, the communication interface 28 or the like, is configured to receive a second response from the second request processor 16. See block 58 of FIG. 3. In the context of an electronic healthcare message and, more particularly, a medical claim, the second response may provide an indication as to the coverage, if any, provided by the claims payor for the medication that is the subject of the medical claim. In one embodiment, the second response of the first type indicates that coverage is not provided by a medical insurance plan of the patient. In this situation, the second response may provide an indication as to the reason for denial of the medical claim. In this embodiment, the second response of the second type indicates that coverage is provided by a medical insurance plan of the patient. In this situation, the second response may provide a reimbursement amount indicative of the monetary amount for which the pharmacy will be reimbursed by the claims payor in response to dispensation of the medication that is the subject of the medical claim and, in some embodiments, an indication of the patient's out-of-pocket costs attributable to, for example, satisfaction of the patient's deductible, the patient's co-pay, etc. for the dispensation of the medication may also be provided.

With reference to the operations depicted in FIG. 3, the electronic message is analyzed to identify the action to be taken in block 44. In the context of an electronic healthcare message, in an instance in which the analysis of the electronic healthcare message, such as an analysis of the qualifier field 84, indicates that a first action in the form of the adjudication of a prescription claim is to be taken, a prescription claim may be first submitted for adjudication as shown in blocks 46-52 and a medical claim may then be submitted for adjudication as shown in blocks 54-58 in an instance in which the prescription claim is rejected. However, in an instance in which the analysis of the electronic message indicates that a second action to be taken, the computing device follows a different work flow. In this regard, in the context of an electronic healthcare message, in an instance in which the analysis of the electronic healthcare message, such as an analysis of the qualifier field, indicates that a second action in the form of the adjudication of a medical claim is to be taken, the computing device 20, such as the processing circuitry 22, the processor 24 or the like, is configured to construct a second message. See block 64 of FIG. 3. In the context of an electronic healthcare message, the computing device is configured to construct a second message in the form of a medical claim, such as a medical reimbursement request, the predetermination of medical benefits request or the like. As noted above, the medical claim may be constructed from information included within the second portion 88 of the electronic healthcare message and, in some embodiments, in combination with some of the information from the first portion 86 of the electronic healthcare message.

The computing device 20, such as the processing circuitry 22, the processor 24, the communication interface 28 or the like, is also configured to transmit the second message to the second request processor 18, such as a medical claims processor of a payor of medical claims, e.g., an insurance company. See block 66 of FIG. 3. Based upon the second message, the computing device, such as the processing circuitry, the processor, the communication interface or the like, is configured to receive a second response from the second request processor. See block 68 of FIG. 3. In the context of an electronic healthcare message and, more particularly, a medical claim, the second response may provide an indication as to the coverage, if any, provided by the claims payor for the medication that is the subject of the medical claim. In an instance in which the second response indicates that coverage is not provided by a medical insurance plan of the patient, the second response may also provide an indication as to the reason for denial of the medical claim. Alternatively, in an instance in which the second response indicates that coverage is provided by a medical insurance plan of the patient, the second response may provide a reimbursement amount indicative of the monetary amount for which the pharmacy will be reimbursed by the claims payor in response to dispensation of the medication that is the subject of the medical claim and, in some embodiments, an indication of the patient's out-of-pocket may also be provided.

As shown in FIG. 3, after having received either the second type of the first response or the second response, the computing device 20 is configured to construct a response to the electronic message and to then cause the response to be transmitted to the source 12 of the electronic message. See blocks 60 and 62 of FIG. 3. As such, the source can receive information, such as feedback or the like, based upon the electronic message from the first or second request processors 16, 18.

In the context of an electronic healthcare message, in an instance in which the analysis of the first response indicates that the first response is of the second type in that the first response provides an indication that the medication or service that was the subject of the electronic healthcare message is properly the subject of a prescription claim and is covered by a prescription benefits plan, a prescription insurance plan or the like, the computing device of this example embodiment causes a response to the electronic healthcare message to be constructed and then transmitted to the source, such as a pharmacy management system, based upon the first response. In this instance, the response generally includes the information provided by the prescription claims processor, such as an indication as to whether the claims payor provides coverage for the prescription claim and, if so, the reimbursement amount associated therewith and optionally the patient's out-of-pocket costs.

However, in an instance in which the computing device 20 receives a second response, either following a determination that the first response is of a first type, such as a first response indicating that the prescription claim has been rejected, or an initial determination that the electronic message calls for a second action to be taken, the computing device of this example embodiment causes a response to the electronic healthcare message to be constructed and then transmitted to the source 12, such as the pharmacy management system, based upon the second response. In this instance, the response generally includes the information provided by the medical claims processor, such as an indication as to whether the claims payor provides coverage for the medical claim and, if so, the reimbursement amount associated therewith and optionally the patient's out-of-pocket costs.

The source 12, such as the pharmacy management system, is therefore provided with the response that includes the information provided by the first or second request processors 16, 18. In an instance in which the response is constructed from the first response, the source is provided with information from the first request processor, such as a prescription claims processor. Thus, the response in this instance provides an indication as to whether the claims payor provides coverage for the prescription claim and, if so, the reimbursement amount for the prescription claim. Conversely, in an instance in which the response is constructed from the second response, the source is provided with information from the second request processor, such as a medical claims processor. Thus, the response in this instance provides an indication as to whether the claims payor provides coverage for the medical claim and, if so, the reimbursement amount for the medical claim. Based upon the response to the electronic healthcare message provided by the service provider 14, a pharmacist may proceed to dispense the medication that is the subject of the prescription in an instance in which the pharmacy is to be fully reimbursed by the claims payor or may counsel the patient as to the out-of-pocket amount that the payor must personally pay prior to dispensing the medication in an instance in which the reimbursement amount is less than the full cost of the medication.

As shown in block 70 and regardless of whether the first action or the second action was taken, the computing device 20, such as the processing circuitry 22, the processor 24, the database 30 or the like, is also configured to store one or more of the electronic message, the first message to the first request processor 16, the first response from the first request processor, the second message to the second request processor 18, the second response from the second request processor and/or the response to the electronic message in the database. For example, each of these messages and responses may be stored in the database, such as in separate tables with each table of the database configured to store a different type of message or response. As such, the database allows prior messages and responses to be readily recalled without having to re-construct the messages or responses. In addition, the database provides an audit trail associated with the handling of the different electronic requests.

An example in which the method, computing device 20 and computer program product of an example embodiment parses an electronic message, such as an electronic healthcare message, and construct differently prioritized messages therefrom is depicted in FIG. 5. In this example embodiment and as shown by signal flow 1, the service provider 14 receives an electronic message, such as an electronic healthcare message, from a source 12, such as a pharmacy management system of a pharmacy. The computing device of the service provider, such as the processing circuitry 22, the processor 24 of the like, parses the electronic message to separately identify first and second differently formatted portions and then analyzes the electronic message to identify an action to be taken. For example, based upon a qualifier field 84 of the electronic message, the computing device of the service provider may determine whether the electronic healthcare message is to be processed as a prescription claim, at least initially, or is to be processed as a medical claim.

In an instance in which the electronic healthcare message is determined to present a prescription claim, the service provider 14 constructs a first message based on the first portion of the electronic message and transmits the first message to a first request processor 16, such as a prescription claims processor, for adjudication of the prescription claim, such as a prescription reimbursement request or a predetermination of prescription benefits request. See signal flow 2 of FIG. 5. The service provider then receives a first response from the first request processor providing the results of the adjudication of the prescription claim, such as the coverage provided for the medication, as shown in signal flow 3 of FIG. 5. In an instance in which an analysis of the first response indicates that the electronic healthcare message was properly adjudicated as a prescription claim as a result of coverage being provided by the prescription benefits plan or prescription insurance plan of the patient, the service provider may then provide a response to the electronic message to the source 12, such as the pharmacy management system, based upon the first response from the first request processor. See signal flow 6 of FIG. 5. As such, in the context of a prescription claim, such as a prescription reimbursement request or a predetermination of prescription benefits request, the source, such as the pharmacy management system, is provided with information indicative of the coverage provided to the patient for the medication pursuant to the prescription benefit plan or the prescription insurance plan of the patient.

In contrast, either in an instance in which the initial analysis of the electronic healthcare message, such as the qualifier field 84 of the electronic healthcare message, indicates that the electronic healthcare message relates to a medical claim or in an instance in which the first response from the first request processor 16 indicates that the prescription claim is rejected, the service provider 14 treats the electronic healthcare message as a medical claim, constructs a second message based at least on the second portion of the electronic message and transmits the second message to a second request processor 18, such as a medical claims processor, for adjudication of the medical claim, such as a medical reimbursement request or a predetermination of medical benefits request. See signal flow 4 of FIG. 5. The service provider then receives a second response from the second request processor providing the results of the adjudication of the medical claim, such as the coverage provided for the medication by the medical insurance plan of the patient, as shown in signal flow 5 of FIG. 5. The service provider may then provide a response to the electronic message to the source 12, such as the pharmacy management system, based upon the second response from the second request processor. See signal flow 6 of FIG. 5. As such, in the context of a medical claim, such as a medical reimbursement request or a predetermination of medical benefits request, the source, such as the pharmacy management system, is provided with information indicative of the coverage provided to the patient for the medication pursuant to the medical insurance plan of the patient.

Thus, the computing device 20 of this example embodiment increases the efficiency with which prescription claims and medical claims are evaluated. In this regard, in an instance in which a source 12, such as a pharmacy management system, is unable to determine whether coverage would be provided for a medication, such as a specialty medication, by the patient's prescription benefits plan or prescription insurance plan on the one hand and the patient's medical insurance plan on the other hand, the computing device is responsive to a single message to adjudicate the claim first as a prescription claim and then, in unsuccessful, as a medical claim. Thus, in an instance in which the prescription claim is rejected, the computing device is configured to permit a medical claim for the same medication or service that was the subject of the prescription claim to be adjudicated without interaction with the source at the time of adjudication, thereby reducing message traffic and increasing the speed with which responses to medical claims may be provided to a pharmacy. As such, a pharmacy can respond to patients more quickly, such as in real time or near real time, not only to prescription claims, but also to medical claims in an instance in which the pharmacy was not aware, at least not initially, as to the type of claim to be submitted for the medication or service.

As noted above, FIG. 3 is a flowchart illustrating the operations performed by a method, apparatus and computer program product, such as computing device 20 of FIG. 2, in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of a computing device employing an embodiment of the present invention and executed by processing circuitry 22, e.g., a processor 24, of the computing device. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIG. 3, when executed, convert a computer or processing circuitry into a particular machine configured to perform an example embodiment of the present invention. Accordingly, the operations of FIG. 3 define an algorithm for configuring a computer or processing circuitry, e.g., processor, to perform an example embodiment. In some cases, a general purpose computer may be provided with an instance of the processor which performs the algorithm of FIG. 3 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions. In some embodiments, certain ones of the operations above may be modified or further amplified and additional optional operations may be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. For example, although the service provider 14 that embodies the computing device 20 is described to be a switch, the service provider and/or the computing device may be embodied by other entities, such as a pharmacy benefits manager (PBM), in other embodiments. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computing device configured to parse an electronic healthcare message and to construct multiple differently prioritized healthcare messages therefrom, the computing device comprising:

a communication interface configured to receive the electronic healthcare message from a pharmacy management system, wherein the electronic healthcare message comprises a first portion formatted in accordance with a first predefined format associated with a prescription claim and a second portion formatted in accordance with a second predefined format associated with a medical claim, and wherein the second portion is formatted differently than the first portion;

processing circuitry configured to:

parse the electronic healthcare message to separately identify the first and second portions;

analyze the electronic healthcare message to identify a qualifier field indicative of an action to be taken based thereupon;

in response to identification of a first action related to a prescription claim to be taken based upon a determination that the qualifier field indicates that the electronic healthcare message relates to the prescription claim as opposed to a medical claim, construct the prescription claim based at least in part upon the first portion formatted in accordance with the first predefined format to be transmitted to a prescription claims processor for adjudication;

based upon the prescription claim including the first portion formatted in accordance with the first predefined format, receive a first response from the prescription claims processor;

analyze the first response and, in an instance in which the first response comprises a denial of the prescription claim even though the qualifier field fails to indicate that the electronic healthcare message relates to a medical claim and, instead, indicates that the electronic healthcare message relates to the prescription claim, construct the medical claim comprising a subject of the prescription claim and based at least in part upon the second portion formatted in accordance with the second predefined format, and cause the medical claim that is constructed based at least in part upon the second portion formatted in accordance with the second predefined format to be transmitted to a medical claims processor, different than the prescription claims processor, for adjudication, such that the construction and adjudication of the prescription claim is prioritized relative to the construction and adjudication of the medical claim, wherein the medical claim is constructed and caused to be transmitted to the medical claims processor without an exchange of messages with the pharmacy management system;

based upon the medical claim, receive a second response from the medical claims processor; and based upon at least one of the first response from the prescription claims processor or the second response from the medical claims processor, construct a response to the electronic healthcare message that is to be transmitted to the pharmacy management system; and a database in communication with the processing circuitry and configured to store one or more of the electronic healthcare message, the prescription claim, the first response, the medical claim, the second response or the response to the electronic healthcare message.

2. A computing device according to claim 1 wherein the qualifier field has different predefined values with each predefined value representative of a different type of electronic healthcare message including a first value to identify the electronic healthcare message to be related to the prescription claim and a second value to identify the electronic healthcare message to be related to the medical claim.

3. A computing device according to claim 1 wherein the processing circuitry is configured to construct the medical claim based upon parts of both the first and second portions of the electronic healthcare message including the subject of the prescription claim that is provided by the first portion of the electronic healthcare message.

4. A computing device according to claim 1 wherein the processing circuitry is configured to construct the prescription claim based upon the first portion of the electronic healthcare message without reference to the second portion of the electronic healthcare message.

5. A computing device according to claim 1 wherein the first action comprises an adjudication request for the prescription claim, and wherein the second action comprises an adjudication request for the medical claim.

6. A method for parsing an electronic healthcare message and constructing multiple differently prioritized healthcare messages therefrom, the method comprising:

receiving an electronic healthcare message from a pharmacy management system, wherein the electronic healthcare message comprises a first portion formatted in accordance with a first predefined format associated with a prescription claim and a second portion formatted in accordance with a second predefined format associated with a medical claim, and wherein the second portion is formatted differently than the first portion;

parsing the electronic healthcare message to separately identify the first and second portions;

analyzing the electronic healthcare message to identify a qualifier field indicative of an action to be taken based thereupon;

in response to identification of a first action related to a prescription claim to be taken based upon a determination that the qualifier field indicates that the electronic healthcare message relates to the prescription claim as opposed to a medical claim, constructing the prescription claim based at least in part upon the first portion formatted in accordance with the first predefined format to be transmitted to a prescription claims processor for adjudication;

based upon the prescription claim including the first portion formatted in accordance with the first predefined format, receiving a first response from the prescription claims processor;

analyzing the first response and, in an instance in which the first response comprises a denial of the prescription claim even though the qualifier field fails to indicate that the electronic healthcare message relates to a medical claim and, instead, indicates that the electronic healthcare message relates to the prescription claim, constructing the medical claim comprising a subject of the prescription claim and based at least in part upon the second portion formatted in accordance with the second predefined format, and causing the medical claim that is constructed based at least in part upon the second portion formatted in accordance with the second predefined format to be transmitted to a medical claims processor, different than the prescription claims processor, for adjudication, such that the construction and adjudication of the prescription claim is prioritized relative to the construction and adjudication of the medical claim, wherein the medical claim is constructed and caused to be transmitted to the medical claims processor without an exchange of messages with the pharmacy management system;

based upon the medical claim, receiving a second response from the medical claims processor;

based upon at least one of the first response from the prescription claims processor or the second response from the medical claims processor, constructing a response to the electronic healthcare message that is to be transmitted to the pharmacy management system; and in a database, storing one or more of the electronic healthcare message, the prescription claim, the first response, the medical claim, the second response or the response to the electronic healthcare message.

7. A method according to claim 6 wherein the qualifier field has different predefined values with each predefined value representative of a different type of electronic healthcare message including a first value to identify the electronic healthcare message to be related to the prescription claim and a second value to identify the electronic healthcare message to be related to the medical claim.

8. A method according to claim 6 wherein constructing the medical claim comprises constructing the medical claim based upon parts of both the first and second portions of the electronic healthcare message including the subject of the prescription claim that is provided by the first portion of the electronic healthcare message.

9. A method according to claim 6 wherein constructing the prescription claim comprises constructing the prescription claim based upon the first portion of the electronic healthcare message without reference to the second portion of the electronic healthcare message.

10. A method according to claim 6 wherein the first action comprises an adjudication request for the prescription claim, and wherein the second action comprises an adjudication request for the medical claim.

11. A computer program product configured to parse an electronic healthcare message and construct multiple differently prioritized healthcare messages therefrom, the computer program product comprising a non-transitory computer readable medium having program code stored thereon, the program code comprising program code instructions configured, upon execution, to:

receive an electronic healthcare message from a pharmacy management system, wherein the electronic healthcare message comprises a first portion formatted in accordance with a first predefined format associated with a prescription claim and a second portion formatted in accordance with a second predefined format associated with a medical claim, and wherein the second portion is formatted differently than the first portion;

parse the electronic healthcare message to separately identify the first and second portions;

analyze the electronic healthcare message to identify a qualifier field indicative of an action to be taken based thereupon;

in response to identification of a first action related to the prescription claim to be taken based upon a determination that the qualifier field indicates that the electronic healthcare message relates to the prescription claim as opposed to a medical claim, construct the prescription claim based at least in part upon the first portion formatted in accordance with the first predefined format to be transmitted to a prescription claims processor for adjudication;

based upon the prescription claim including the first portion formatted in accordance with the first predefined format, receive a first response from the prescription claims processor;

analyze the first response and, in an instance in which the first response comprises a denial of the prescription claim even though the qualifier field fails to indicate that the electronic healthcare message relates to a medical claim and, instead, indicates that the electronic healthcare message relates to the prescription claim, construct the medical claim comprising a subject of the prescription claim and based at least in part upon the second portion formatted in accordance with the second predefined format, and cause the medical claim that is constructed based at least in part upon the second portion formatted in accordance with the second predefined format to be transmitted to a medical claims processor, different than the prescription claims processor, for adjudication, such that the construction and adjudication of the prescription claim is prioritized relative to the construction and adjudication of the medical claim, wherein the medical claim is constructed and caused to be transmitted to the medical claims processor without an exchange of messages with the pharmacy management system;

based upon the medical claim, receive a second response from the medical claims processor;

based upon at least one of the first response from the prescription claims processor or the second response from the medical claims processor, construct a response to the electronic healthcare message that is to be transmitted to the pharmacy management system; and in a database, store one or more of the electronic healthcare message, the prescription claim, the first response, the medical claim, the second response or the response to the electronic healthcare message.

12. A computer program product according to claim 11 wherein the qualifier field has different predefined values with each predefined value representative of a different type of electronic healthcare message including a first value to identify the electronic healthcare message to be related to the prescription claim and a second value to identify the electronic healthcare message to be related to the medical claim.

13. A computer program product according to claim 11 wherein the program code instructions configured to construct the medical claim comprise program code instructions configured to construct the medical claim based upon parts of both the first and second portions of the electronic healthcare message including the subject of the prescription claim that is provided by the first portion of the electronic healthcare message.

14. A computer program product according to claim 11 wherein the program code instructions configured to construct the prescription claim comprise program code instructions configured to construct the prescription claim based upon the first portion of the electronic healthcare message without reference to the second portion of the electronic healthcare message.

15. A computing device according to claim 1, wherein the subject comprises a medication or a medical service.

16. A computing device according to claim 1, wherein the first predefined format is in accordance with the National Council for Prescription Drug Programs (NCPDP) telecommunications standard.

17. A computing device according to claim 1, wherein the processing circuitry is further configured to cause the response to the electronic healthcare message to be transmitted to the pharmacy management system so as to respond to the electronic healthcare message in real time or near real time.

18. A method according to claim 6, further comprising causing the response to the electronic healthcare message to be transmitted to the pharmacy management system so as to respond to the electronic healthcare message in real time or near real time.

19. A computer program product according to claim 11, wherein the program code instructions are configured to construct the response to the electronic healthcare message so as to respond to the electronic healthcare message in real time or near real time.

* * * * *